(12) United States Patent
Lalancette

(10) Patent No.: US 9,219,355 B2
(45) Date of Patent: Dec. 22, 2015

(54) BREAKABLE PROTECTOR PLATE

(71) Applicant: Thomas & Betts International LLC, Wilmington, DE (US)

(72) Inventor: Daniel Lalancette, St-Jean-sur-Richelieu (CA)

(73) Assignee: Thomas & Betts International LLC, Wilmington, DE (US)

( * ) Notice: Subject to any disclaimer, the term of this patent is extended or adjusted under 35 U.S.C. 154(b) by 239 days.

(21) Appl. No.: 13/768,087

(22) Filed: Feb. 15, 2013

(65) Prior Publication Data

US 2013/0277103 A1    Oct. 24, 2013

Related U.S. Application Data

(60) Provisional application No. 61/636,798, filed on Apr. 23, 2012.

(51) Int. Cl.
| | |
|---|---|
| *H02G 3/04* | (2006.01) |
| *H02G 3/12* | (2006.01) |
| *H02G 3/32* | (2006.01) |
| *H02G 3/38* | (2006.01) |

(52) U.S. Cl.
CPC .............. *H02G 3/04* (2013.01); *H02G 3/121* (2013.01); *H02G 3/32* (2013.01); *H02G 3/286* (2013.01); *Y10T 29/4979* (2015.01)

(58) Field of Classification Search
CPC ........... H02G 3/121; H02G 3/32; H02G 1/00; H02G 3/081; H02G 3/286; H02G 9/025; Y10S 411/921; Y10S 439/926; Y10T 29/4979; Y10T 29/49798

USPC .......... 174/507, 66, 67; 248/71; 52/220.1, 27, 52/357, 408, 514, 98; 29/413, 417

See application file for complete search history.

(56) References Cited

U.S. PATENT DOCUMENTS

| | | | |
|---|---|---|---|
| 2,277,758 A | 3/1942 | Hawkins | |
| 3,240,869 A | 3/1966 | Jureit | |
| 3,350,501 A | 10/1967 | Jureit | |
| 3,553,346 A | 1/1971 | Ballantyne | |
| 5,163,254 A | 11/1992 | Zastrow et al. | |
| 5,183,288 A * | 2/1993 | Inada et al. | 280/732 |
| 5,531,052 A | 7/1996 | Agar | |
| 5,595,453 A | 1/1997 | Nattel et al. | |
| 5,632,128 A | 5/1997 | Agar | |
| 6,332,299 B1 | 12/2001 | Stewart, III | |
| 6,642,445 B1 | 11/2003 | Lalancette | |
| 7,165,363 B2 | 1/2007 | Headrick, II et al. | |
| 7,762,032 B2 | 7/2010 | Frenkel | |
| 7,825,337 B2 | 11/2010 | Young, IV | |

(Continued)

FOREIGN PATENT DOCUMENTS

| | | |
|---|---|---|
| CA | 2121451 | 8/2000 |
| CA | 2097969 | 8/2002 |

(Continued)

*Primary Examiner* — Adrian S Wilson
*Assistant Examiner* — Abhishek Rathod
(74) *Attorney, Agent, or Firm* — Hoffmann & Baron, LLP

(57) ABSTRACT

A breakable protector plate is provided for preventing damage to wires or cables which are behind the protector plate. The plate comprises a weakened break line. To prevent nails or screws from penetrating the reduced material thickness at the break line, the surface of the break line is raised with respect to the plate in order to redirect nails or screws into a greater thickness area of the plate.

15 Claims, 4 Drawing Sheets

(56) References Cited

U.S. PATENT DOCUMENTS

| | | | |
|---|---|---|---|
| 8,082,701 B1 | 12/2011 | Wendel | |
| 2003/0056964 A1* | 3/2003 | Lalancette et al. | 174/50 |
| 2011/0209912 A1 | 9/2011 | Korcz et al. | |

FOREIGN PATENT DOCUMENTS

| | | |
|---|---|---|
| CA | 2434297 | 9/2007 |
| CA | 2699543 | 10/2010 |
| CA | 2731812 | 8/2011 |

* cited by examiner

BREAKABLE PROTECTOR PLATE

CROSS-REFERENCE TO RELATED APPLICATION

This application claims priority under 35 U.S.C. §119, based on U.S. Provisional Patent Application No. 61/636,798, filed Apr. 23, 2012, the disclosure of which is hereby incorporated by reference herein.

FIELD OF THE INVENTION

In general, the present invention relates to a breakable protector plate for protecting cables or wires which are run through studs. The breakable protector plate comprises a raised surface along the break line to prevent nails or screws from penetrating the plate, thus preventing damage to the cables or wires.

BACKGROUND

In residential and commercial construction, wires and cables are often run through studs which are used for framing homes and buildings. Protector plates are often installed on studs which have cables running through them. These protector plates prevent nails or screws which are used to hang drywall from penetrating through the studs and causing damage to the wires or cables that are running through them. For adjacent protector plates, a small gap exists which could result in a nail or screw being driven into the gap and damaging the wires or cables that are running through the studs.

SUMMARY OF THE INVENTION

The present invention provides a breakable protector plate for protecting cables and wires which are run through studs, with the plate comprising a raised surface along the break line of the plate. The breakable protector plate can be broken along the break line so that it can be sized to fit one or multiple stud widths. The break line is weakened in comparison to the rest of the plate. It is preferred that the material thickness of the plate is reduced at the break line so that the plate is breakable. To prevent a nail or screw from penetrating the plate on the break line, the break line has been raised with respect to the surface of the remainder of the plate. This raised break line causes a screw or nail which is driven into the plate at the break line to be redirected to either the left or right side of the break line and onto a full thickness area of the plate to prevent penetration.

DETAILED DESCRIPTION OF THE PREFERRED EMBODIMENT(S)

Figure 1:
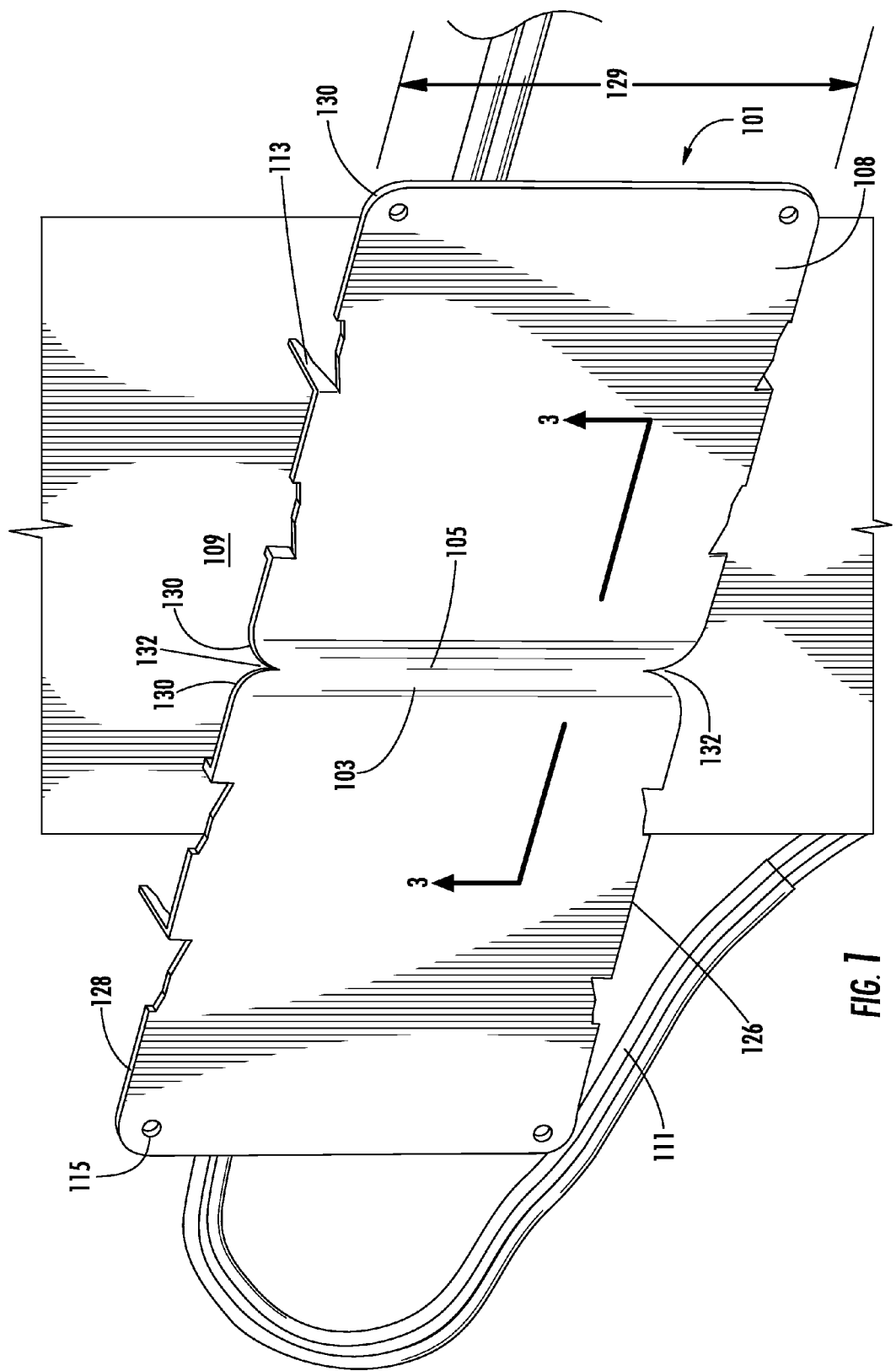
FIG. 1 is a front perspective view of an unbroken breakable protector plate of the present invention.

The above and other features, aspects and advantages of the present invention will now be discussed in the following detailed description of preferred embodiments and appended claims, which are to be considered in conjunction with the accompanying drawings in which identical reference characters designate like elements throughout the views.

Figure 2:
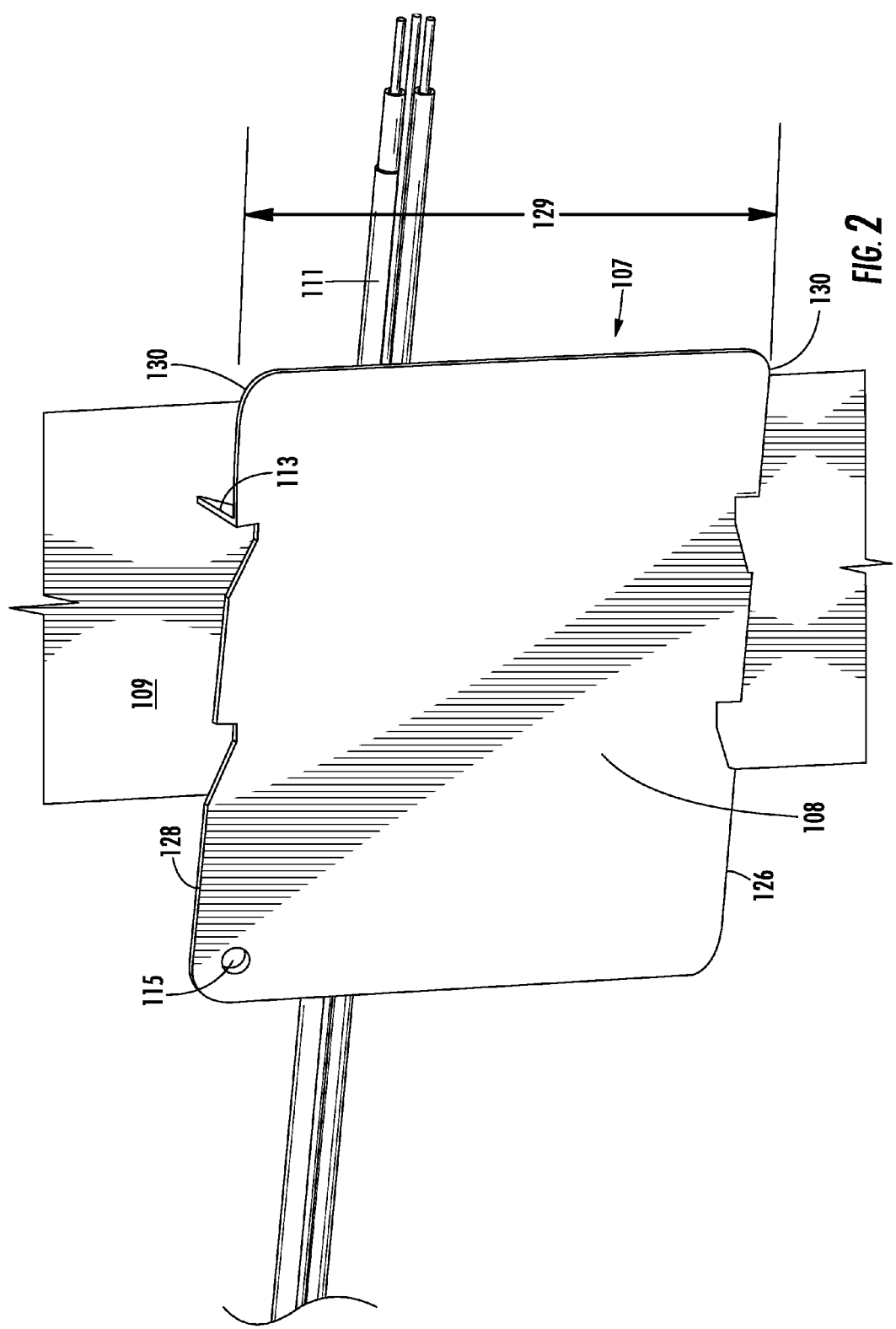
FIG. 2 is a front perspective view of a broken breakable protector plate of the present invention.
Figure 3:
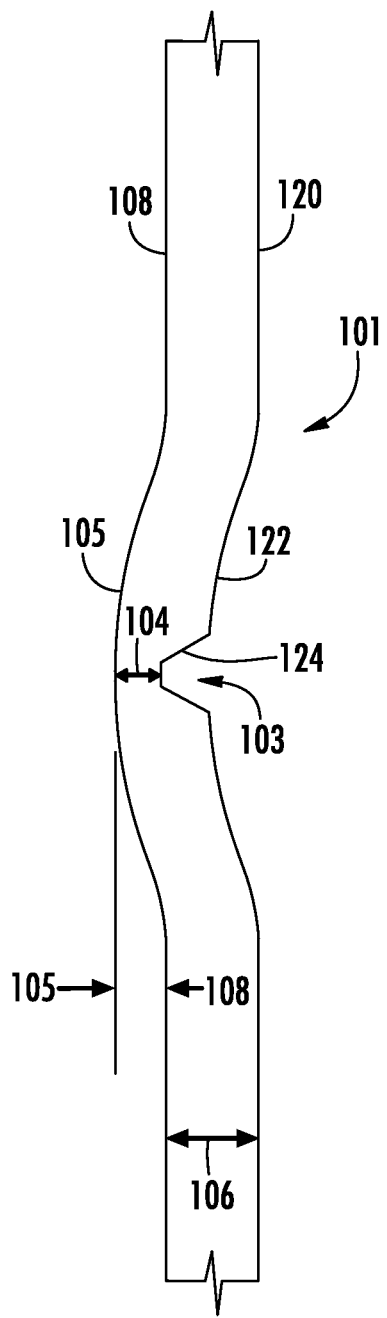
FIG. 3 is a cross-sectional elevational view of a raised surface along the break line of a breakable protector plate of the present invention, taken along lines 3-3 of FIG. 1.
Figure 4:
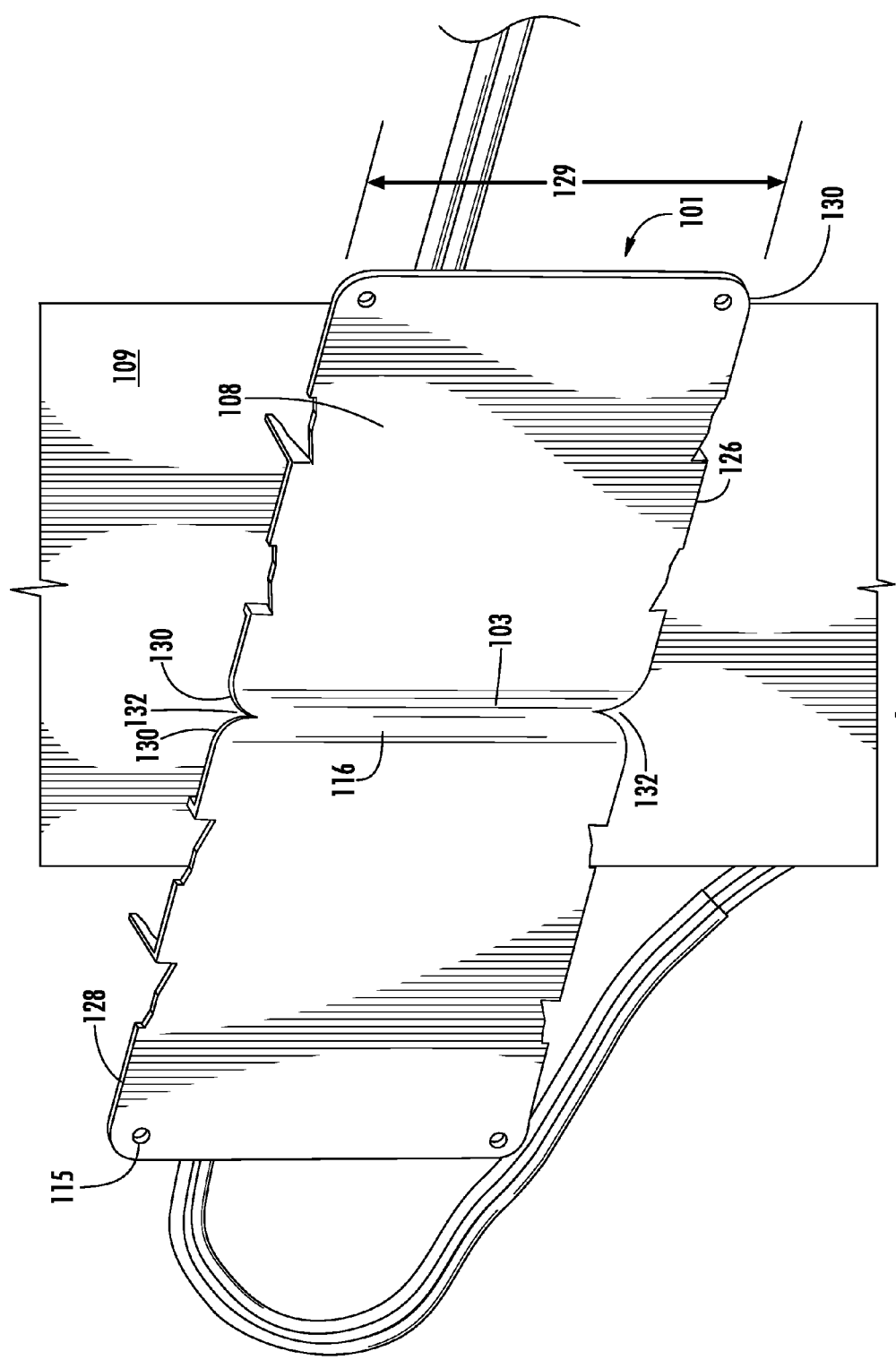
FIG. 4 is a front perspective view of an unbroken breakable protector plate of the present invention which has a weakened break line.

Shown in FIG. 1 is a front perspective view of an unbroken breakable protector plate 101. The plate 101 can be mounted onto a stud 109 with integral nails 113 or by screws or nails via integral screw or nail holes 115. The plate 101 protects wires or cables 111 from being damaged by fasteners such as screws or nails when drywall is being hung over the studs. In FIG. 1, the breakable protector plate is shown in unbroken form, which allows it to span multiple studs if necessary. In FIG. 3, the breakable protector plate 101 has an outer surface 108. An inner surface 120 is opposite the outer surface 108 and spaced apart therefrom by a generally uniform material thickness 106. A raised surface 105 extends along the outer surface 108. The raised surface 105 is raised away from the plate 101. A concave surface 122 extends along the inner surface 120. The concave surface 122 is juxtaposed opposite the raised surface 105 and is spaced apart therefrom by the generally uniform material thickness 106. Also shown in FIG. 1 is a break line 103 which is formed as part of the breakable protector plate 101. The break line 103 extends along the plate 101 between the raised surface 105 and the concave surface 122. Along the break line 103 of the breakable protector plate 101, the material thickness of the plate is reduced, as is shown in a cross-sectional elevation view of the break line in FIG. 3, to enable an installer to flex the plate 101 at the break line 103 until the plate breaks. In the preferred embodiment, a groove 124 extends along the concave surface 122 and is juxtaposed with the break line 103. The groove 124 extends partway through the plate 101 between the inner surface 120 and the outer surface 108. This serves to decrease the material thickness 104 along the break line 103. The groove 124 thereby allows the plate 101 to break apart along the break line 103. Instead of having a reduced material thickness at the break line, the plate may have a break line that is weakened in comparison to the rest of the plate. For instance, the break line 103 may be perforated 116, as is shown in FIG. 4, or it may be weakened by any other means. In FIG. 2, a broken breakable protector plate 107 is shown which has been broken at the break line 103 which is shown in FIG. 1. Though the breakable protector plate 101 is designed to be broken along the break line 103 due to the reduced material thickness or weakened material, it is under stood that the breakable protector plate may be constructed of a high strength, impact resistant metal or plastic material.

As shown in FIGS. 1 and 2, the breakable protector plate 101 has a first edge 126 and a second edge 128 opposite the first edge 126. The edges 126, 128 are spaced apart by a generally uniform plate width 129. The break line 103 extends between the first edge 126 and the second edge 128. The break line 103 is approximately equal in length to the plate width 129. The break line 103 is disposed generally perpendicular to either one of the first edge 126 or the second edge 128. In FIG. 3, a cross-sectional elevation view is shown of the break line 103 of an unbroken breakable protector plate 101. From this view, it can be seen that the break line 103 follows a raised surface 105 with respect to the outer surface 108 of the plate 101. The raised surface 105 acts as a mechanism to redirect a fastener which is driven in directly at the break line 103. When a fastener is driven in at the break line 103, the raised surface 105 forces the fastener to be driven towards either the left side or the right side of the break line 103 and into a greater material thickness 106 of the plate than the reduced material thickness 104 of the break line. By redirecting the fastener into a greater material thickness area of the protector plate, the fastener is not able to penetrate the protector plate, and thus prevents damage to any wires or cables which are behind the unbroken protector plate 101 that may span several studs 109, as is shown in FIG. 1. Each broken protector plate 107 includes four corners 130, and each corner 130 has a corner radius 130. Two adjacent broken protector plates 107 will have two adjacent corner radii at each end of the break line 103. On the breakable protector plate 101, these adjacent corner radii form a notch 132 at each end of the break line 103. The notch 132 induces the plate 101 to break apart along the break line 103. Each corner radius 130 also protects personnel from sharp corners and burrs.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above mentioned description is to be considered exemplary, rather than limiting, and the true scope of the invention is that defined in the following claims.

What is claimed is:

1. A breakable protector plate for protecting wire or cable which is run through at least one stud, the plate comprising:
    an outer surface adapted for facing away from the stud;
    an inner surface opposite the outer surface and spaced apart therefrom by a generally uniform material thickness, the inner surface being adapted for mounting against the stud;
    a raised surface extending along the outer surface, the raised surface projecting outward away from the plate;
    a concave surface extending along the inner surface, the concave surface being juxtaposed opposite the raised surface and spaced apart therefrom;
    a break line which is weakened and allows for the breakable protector plate to be broken, the break line extending along the breakable protector plate between the raised surface and the concave surface, so as to allow separating the breakable protector plate into two broken protector plates; and
    wherein the raised surface will redirect a fastener away from the break line to prevent the fastener from penetrating the breakable protector plate and damaging the wire or cable which is behind the plate.

2. The breakable protector plate of claim 1, wherein the plate further comprises at least one integral nail projecting away from the inner surface of the plate, the integral nail being adapted for mounting the plate onto the at least one stud.

3. The breakable protector plate of claim 1, wherein the plate is comprised of a high strength, impact resistant metal material.

4. The breakable protector plate of claim 1, wherein the plate is comprised of a high strength, impact resistant plastic material.

5. The breakable protector plate of claim 1, wherein the plate comprises integral screw or nail holes for mounting the plate onto the at least one stud by screws or nails.

6. The breakable protector plate of claim 1, wherein the break line has a reduced material thickness with respect to the remainder of the plate.

7. The breakable protector plate of claim 1, further comprising:
    a first edge; and
    a second edge opposite the first edge and spaced apart therefrom by a generally uniform plate width, wherein the break line extends between the first edge and the second edge, the break line is generally equal in length to the plate width, and the break line is disposed generally perpendicular to one of the first edge and the second edge.

8. The breakable protector plate of claim 7, wherein each broken protector plate further comprises:
    two integral nails in one of the first edge and the second edge;
    at least one integral nail in the opposite edge, for mounting the plate onto the at least one stud with at least three integral nails, so as to preclude tilting the plate with respect to the stud.

9. The breakable protector plate of claim 1, further comprising a groove extending along the concave surface and juxtaposed with the break line, the groove extending partway through the plate between the inner surface and the outer surface, so as to decrease the material thickness along the break line, thereby allowing the plate to break along the break line.

10. The breakable protector plate of claim 1, further comprising:
    each broken protector plate includes four corners, each corner having a corner radius; and
    the adjacent corner radii of adjacent broken protector plates of the breakable protector plate forming a notch at each end of the break line.

11. A breakable protector plate for protecting wire or cable which is run through at least one stud, the plate comprising:
    an outer surface;
    an inner surface opposite the outer surface and spaced apart therefrom by a generally uniform material thickness;
    a raised surface extending along the outer surface, the raised surface being raised away from the plate;
    a concave surface extending along the inner surface, the concave surface being juxtaposed opposite the raised surface and spaced apart therefrom by the generally uniform material thickness;
    a first edge;
    a second edge opposite the first edge and spaced apart therefrom by a generally uniform plate width;
    a break line which is weakened and allows for the breakable protector plate to be broken, the break line extending along the breakable protector plate between the raised surface and the concave surface, so as to separate the breakable protector plate into two broken protector plates, the break line extending between the first edge and the second edge, the break line being generally equal in length to the plate width, the break line being disposed generally perpendicular to one of the first edge and the second edge;
    at least one integral nail on one of the first edge and the second edge for mounting the plate onto the at least one stud;
    wherein the raised surface will redirect a fastener away from the break line to prevent the fastener from penetrating the breakable protector plate and damaging the wire or cable which is behind the plate.

12. The breakable protector plate of claim 11, further comprising a groove extending along the concave surface and juxtaposed with the break line, the groove extending partway through the plate between the inner surface and the outer surface, so as to decrease the material thickness along the break line, thereby allowing the plate to break along the break line.

13. The breakable protector plate of claim 11, further comprising:

each broken protector plate includes four corners, each corner having a corner radius; and the adjacent corner radii of adjacent broken protector plates of the breakable protector plate forming a notch at each end of the break line.

14. The breakable protector plate of claim 11, wherein the plate is comprised of a high strength, impact resistant material selected from the group consisting of metals and plastics.

15. The breakable protector plate of claim 11, further comprising two integral nails on the first edge and two integral nails on the second edge of each broken protector plate.

* * * * *